July 5, 1949.　　　　E. H. MOSELEY　　　　2,474,856
SPECTACLE TEMPLE OF UNBREAKABLE GLASS
Original Filed Dec. 7, 1945
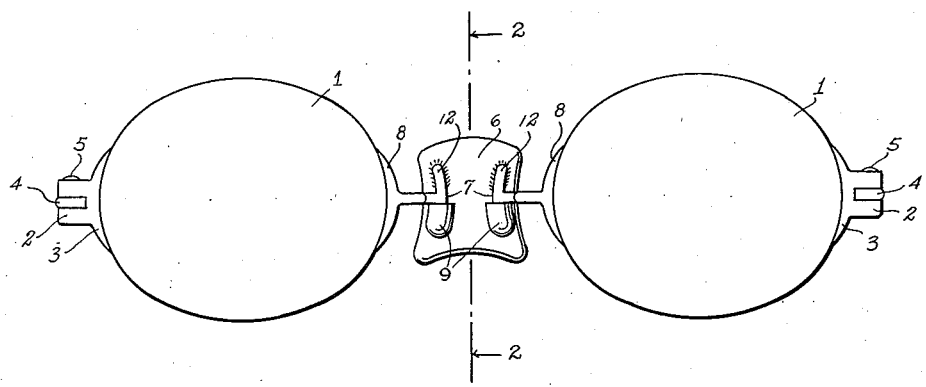
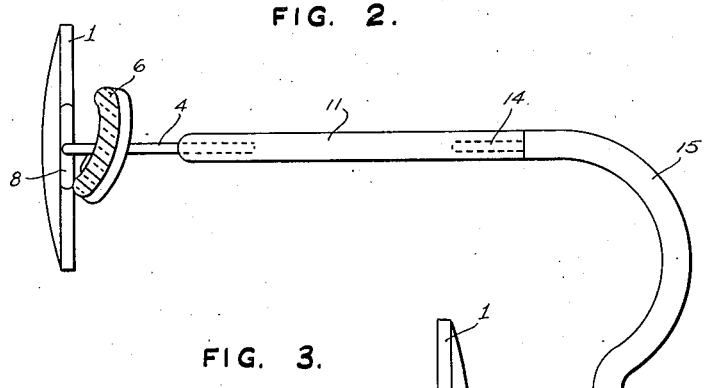
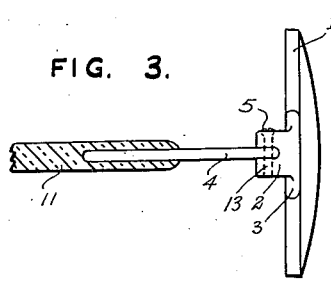
Inventor
ERNST H. MOSELEY,
By McMorrow, Berman & Davidson
Attorneys Patented July 5, 1949

2,474,856

UNITED STATES PATENT OFFICE 2,474,856

SPECTACLE TEMPLE OF UNBREAKABLE GLASS

Ernst H. Moseley, Detroit, Mich.

Original application December 7, 1945, Serial No. 633,351. Divided and this application November 1, 1946, Serial No. 707,301

2 Claims. (Cl. 88—52)

This invention relates to spectacle temple construction, and more particularly to such construction formulated largely of unbreakable transparent glass so that it will be invisible, or nearly so, and also, so that it will be non-corrosive.

This application is a division of my application Serial No. 633,351, filed December 7, 1945, Optical mounting.

It is an object of the invention to provide a temple structure which shall be almost entirely constructed of unbreakable transparent glass, thereby causing same to be practically invisible.

With the foregoing objects in view, together with such other objects and advantages as may subsequently appear, the invention is carried into effect as described in the following specification and as illustrated by way of example in the following drawings, wherein identical numerals are applied to corresponding parts in the several views, and wherein:

Figure 1 is a front elevational view of one embodiment of the invention;

Figure 2 is a section taken on the line 2—2 of Figure 1, in the direction of the arrows;

Figure 3 shows a detail of a temple mounting, partly in section, and viewed in end elevation.

Referring now to the drawings Figures 1, 2 and 3 illustrate one embodiment of the invention having a nose bridge 6 made of unbreakable glass, constructed in horizontal section in the manner of a similar section of a thumb nail, and in vertical section after the manner of a half moon, thereby to conform to the natural contour of the bridge of the human nose. The construction of the nose bridge in the manner heretofore described results in a structure which is practically invisible and results in enhanced comfort to the wearer.

The nose bridge is secured to the two lenses 1 by means of metal structures comprising hooks or anchors 7 which may be cemented or liquid soldered into holes drilled in abutments or cups 9, which may be cast as part of the nose bridge and thereafter drilled to receive the hooks 7, or which may be cast with holes for receiving the hooks 7.

The upper halves 12 of the anchors are cemented or liquid soldered against the front of the bridge 6.

The metal strap ends 8 of the metal structures are either cemented or liquid soldered into slots cut in the edges of the lenses 1 or they may be cemented or liquid soldered against the said edges.

The temple components of the embodiment of the invention comprises strap ends 3, which may be secured to the lenses in the same manner as strap ends 8. The hinge 2 is entirely constructed of non-breakable glass as is the pin 13 having head 5. Secured to the pin 13 is metal end piece 4. The ear wire 15 likewise is constructed of metal. Connecting the metallic structures 4 and 15 is a glass structure 11 having holes to receive ends of wire structures 4 and 15, which may be engaged to the glass structure 11 in any convenient manner, as by casting, countersinking, cementing or liquid soldering.

What I claim is:

1. A temple structure comprising a strap end adapted to be secured to an edge of a lens, a longitudinally extending piece made of metal and having an end secured to said strap end, an ear wire curved so as to fit around the ear of the wearer, and an elongated link member made of non-breakable glass intermediate said longitudinally extending metal piece and said ear wire and connected to the ends of the latter complemental thereto.

2. A temple structure comprising a strap end adapted to be secured to an edge of a lens, a hinge made of non-breakable glass on said strap end, a longitudinally extending piece made of metal and having an end mounted in cooperative relation with said hinge, a pin made of non-breakable glass for securing said hinge and end of said piece together, an ear wire curved so as to fit around the ear of the wearer, and an elongated link member made of non-breakable glass intermediate said longitudinally extending metal piece and said ear wire and connected to the ends of the latter complemental thereto.

ERNST H. MOSELEY.

REFERENCES CITED

The following references are of record in the file of this patent:

UNITED STATES PATENTS

| Number | Name | Date |
| --- | --- | --- |
| 1,167,953 | Uhlemann | Jan. 11, 1916 |
| 1,970,044 | Klein | Aug. 14, 1934 |
| 2,110,459 | Bodee | Mar. 8, 1938 |
| 2,172,959 | Hirtenstein | Sept. 12, 1939 |